United States Patent [19]

Ranchet et al.

[11] Patent Number: 4,613,347

[45] Date of Patent: Sep. 23, 1986

[54] WATER DEAERATION PROCESS

[75] Inventors: Jean. P. Ranchet, Louveciennes; Eric Serval, Boulogne, both of France

[73] Assignee: Compagnie Francaise des Petroles, Paris, France

[21] Appl. No.: 736,508

[22] Filed: May 21, 1985

[30] Foreign Application Priority Data

Jun. 6, 1984 [FR] France .................................. 84 08827

[51] Int. Cl.$^4$ ............................................ B01D 19/00
[52] U.S. Cl. ......................................... 55/53; 55/196; 166/105.5; 175/66
[58] Field of Search ...................... 55/52, 53, 196, 87, 55/178; 175/66; 166/105.4, 105.5

[56] References Cited

U.S. PATENT DOCUMENTS

| | | | |
|---|---|---|---|
| 3,375,886 | 4/1968 | Goodwin et al. | 175/66 |
| 3,774,702 | 11/1973 | Elenburg | 175/66 |
| 3,815,330 | 6/1974 | Lawley | 55/196 X |
| 4,365,978 | 12/1982 | Scott | 55/53 X |
| 4,415,341 | 11/1983 | Echtler | 55/53 |

OTHER PUBLICATIONS

International application WO83/02402, 7-21-83.

Primary Examiner—Charles Hart
Attorney, Agent, or Firm—Sughrue, Mion, Zinn, Macpeak and Seas

[57] ABSTRACT

A process for deaerating water in an upright column immersed in a body of water and equipped at its lower end with an electrical pump which, essentially, provides the water lift in the column, comprises injecting into the upright column, at at least one injection point situated above the electrical pump, fine bubbles of an inert gas, for example purified nitrogen, under a pressure which is at most equal to the hydrostatic pressure in the column at the level of the injection point.

7 Claims, 1 Drawing Figure

U.S. Patent  Sep. 23, 1986  4,613,347
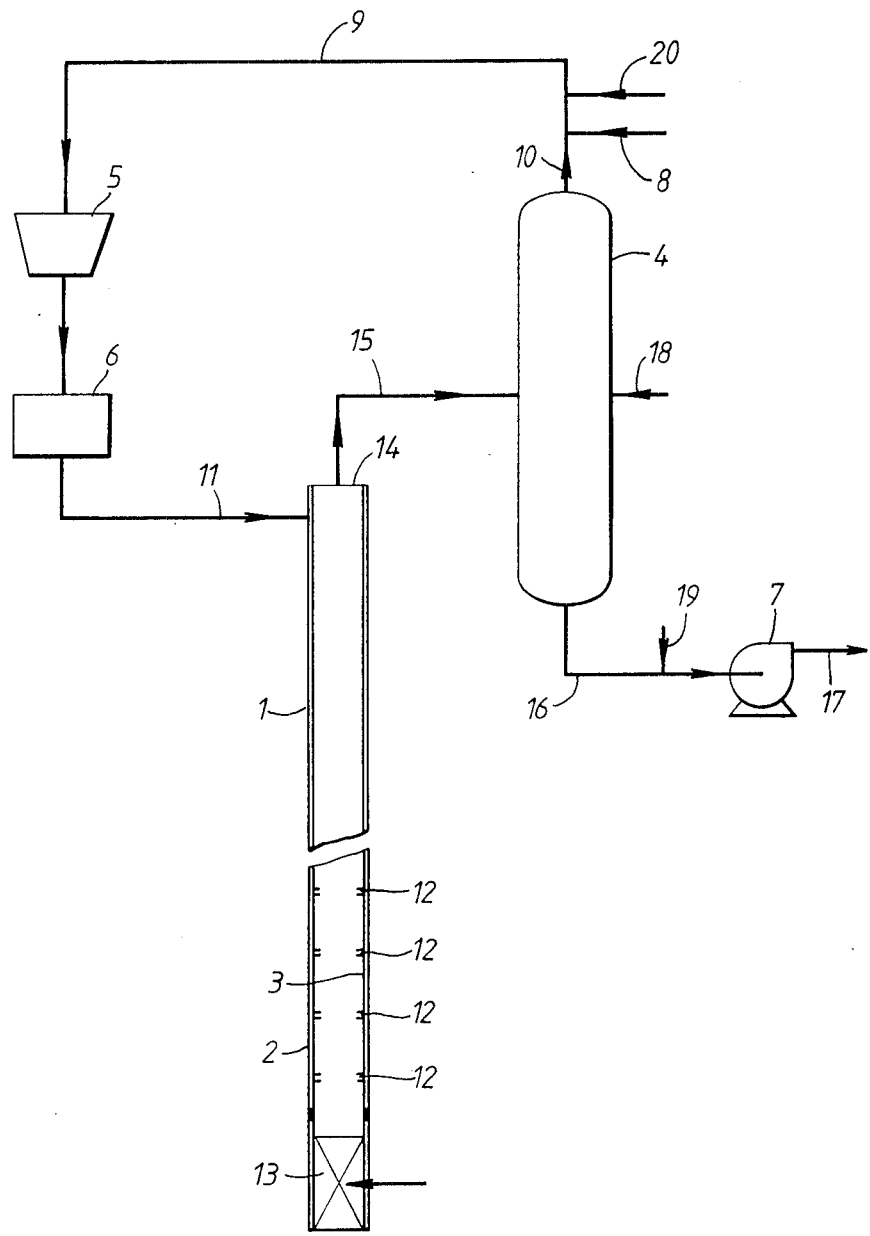

WATER DEAERATION PROCESS

BACKGROUND OF THE INVENTION

The present invention relates to the deaeration of water abstracted from a stretch of water, for example the sea, or from an underground water-bearing stratum for a use in which the presence of oxygen would lead to serious disadvantages, particularly corrosion. A particularly important use is the supply of water for assisted recovery of hydrocarbons.

It is known that water deaeration can be carried out in vacuum towers or in towers employing entrainment by a gas stream.

The principle of the vacuum tower consists in reducing the pressure of the gas phase down to the vapour pressure of water (0.035 bar to 25° C.) by means of vacuum pumps. The water to be degassed enters at the top of a stage, being distributed over the whole cross-section of the tower by means of a perforated distributor or a system of atomizing nozzles. The contact surface between water and gas along the tower is provided by flow over packings such as rings, saddles, woven media, and the like. Conventional towers generally incorporate one to three stages, each three to four metres high, with vacuum takeoff arranged in the intermediate spaces. From an economic standpoint it is preferable to employ two-stage towers and to carry out a final degassing chemically in a capacity arranged at the bottom of the tower.

In towers employing entrainment by a gas stream, entrainment of the dissolved gases present in the liquid phase is produced by subjecting the latter to a countercurrent passage of another gas whose content of the gas to be removed (in this case oxygen) is as low as possible: natural or inert gas. These towers are quite similar to the vacuum towers. The water to be degassed enters at the top of the tower and the entrainment gas just above the storage capacity arranged at the bottom of the tower, the ratio of the volumes of entrainment gas and water to be treated being between 1 and 2. As in the case of vacuum towers, the contact surface between the water and gas can be provided by packings, but it can also be produced by a series of plates. In order for the number of plates to be economically acceptable, a final degassing is generally carried out by a chemical method, as in the case of vacuum towers.

It has recently been proposed to carry out the pumping and the degassing of the water simultaneously by means of a process known as "gas-lift", consisting in injecting an inert gas under pressure at the bottom of an upright column immersed in the stretch of water and open at its bottom end, so that this inert gas drags the water present in this column upwards and at the same time releases most of the oxygen dissolved in the water which it entrains.

This process, theoretically attractive, requires very bulky plants which are not readily compatible with the very restricted space available on a platform at sea.

In point of fact, the two functions which the injected gas is to fulfil, that of lifting the water by pumping and of deaerating it, are contradictory; when the intention is to deaerate the water, the volume of the injected gas does not need to be great, but because of the fact that the energetic efficiency of this gas for lifting the water is low, large quantities of injection gas need to be conveyed; the gas compression and separation units are then very bulky.

SUMMARY OF THE INVENTION

According to the present invention there is provided a process for deaerating water in an upright column immersed in a body of water, or an underground water-bearing stratum, said column being open at its lower end and provided in the region of said open end with an electrical pump which lifts the water in the column, comprising injecting into said upright column, at at least one injection point situated above said electrical pump, an inert gas under a pressure which is at most equal to the hydrostatic pressure of the column full of water at the level of the injection point.

Preferably the electric pump supplies at least 80% of the energy absorbed by the water lift in the upright column.

Preferably, the injection takes place in the form of fine bubbles of gas with a diameter of the order of one millimeter.

The chief advantage of an embodiment of a process according to the present invention consists in the possibility of considerably reducing the bulk of the surface plants. On the one hand, the electric pump is submerged and consumes relatively very little electrical energy because of its excellent pumping efficiency (at least five to six times greater than that which would be provided by an injection gas operating as "gas lift" and required to satisfy the conditions for water deaeration); the auxiliary surface equipment required by the presence of the electrical pump consequently does not need to be bulky. On the other hand, the inert gas flow which is strictly necessary for deaerating the water can be optimized depending on the depth of the injection point or points and the size of the injected gas bubbles. This flow is disparately lower (at least twenty times lower) than the gas flow which would be necessary to provide the water lift completely. Even when this flow is adjusted so that the injection gas contributes to the water lift to an extent which is not absolutely negligible but moderate, for example at most approximately 20%, the inert gas compressor and the electrical motor which drives it are very low-powered machines, requiring a relatively minor electrical installation. Since the inert gas flow is low, separation of the gas from water at the surface requires a separator which is less bulky and which, above all, is capable of being arranged vertically so as to occupy a minimum ground area: at least 5 to 6 times smaller than the area provided for a conventional horizontal separator employed in the case where the water is lifted wholly by "gas-lift".

BRIEF DESCRIPTION OF THE DRAWINGS

An embodiment according to the invention will now be described, by way of example only, with reference to the accompanying drawing wherein.

the single FIGURE shows diagrammatically an embodiment of a plant for deaerating water according to the present invention.

DETAILED DESCRIPTION OF THE PREFERRED EMBODIMENT

As shown in the drawing, an upright column 1 incorporating an outer casing 2 and an inner tube 3 is immersed in a stretch of water, not shown, which can be the sea, a lake or an underground water-bearing stratum in a tract of land.

At the surface of the stretch of water or tract of land there is provided a gas/liquid separator 4 which is preferably vertical, a compressor 5 and a catalytic reaction chamber 6, together with a transfer pump 7 for the water produced. When a marine plant is involved, this equipment is on a platform, the separator 4 being situated wholly above sea level.

An inert gas, consisting, for example, of purified nitrogen, is introduced via a line 8 into a pipeline 9 connecting the gas outlet 10 of the separator 4 to the inlet of the compressor 5. Since the gas circuit is a closed circuit during operation, the line 8 serves only for additions compensating for losses. The inert gas is compressed in the compressor 5 and then passes into the chamber 6 before being injected via a pipeline 11 at the top of the well into the annular space between the tube 3 and the casing 2 to enter the interior of the tube 3 through diffusers 12.

An electrical pump 13 arranged at the bottom of the upright column 1 below the diffusers 12 pumps water up the tube 3. Advantageously the pump provides at least 80% of the energy required to lift the water to the top of the column.

A mixture consisting, on the one hand, of inert gas and of gas extracted from water by the inert gas and, on the other hand, of water, is collected in a pipeline 15 at the top part 14 of the tube 3. The separator 4 makes it possible to separate this mixture into the gaseous phase obtained at the upper outlet 10 and the liquid phase obtained at the lower outlet 16. The water collected at 16 and compressed by the pump or pumps 7 can be conveyed via the pipeline 17 to filters and to a user unit, for example to injection pumps for an assisted recovery of hydrocarbons.

Provision is made in the separator 4 for an inlet 18 for antifoam agents and downstream of the outlet 16 for an inlet 19 for scaling inhibitors and/or other additives. A line 20 makes it possible to introduce into the pipeline 9 hydrogen intended to react in chamber 6 with the oxygen which has been extracted from the water by the inert gas in the tube 3.

In the tube 3 the water is in contact with an inert gas which is poorly soluble in water; this gas is at a pressure P which is at most equal to the hydrostatic pressure of the water and the volume of which is sufficient for the partial pressure of released oxygen P' to remain close to zero. The oxygen dissolved in the water tends to be released so long as its partial pressure in the gas phase remains below a certain value $P'_s$, the equilibrium being defined by Henry's Law:

$$C = H \cdot P_s$$

where: C is the concentration of the oxygen dissolved in the water, in $kg/m^3$; H is Henry's constant for oxygen and expressed in $kg/m^3 Pa$; and $P'_s$ is the partial pressure of oxygen in the gas phase in equilibrium with the liquid phase, expressed in Pa. When P' is lower than $P'_s$ oxygen is released from the liquid phase. If P' were higher than $P'_s$, oxygen would be dissolving. In the present case, since the partial pressure of oxygen in the gas phase is always kept close to zero, oxygen is released all along the tube.

Efforts must be made to make this release as rapid as possible. It is known that the rate of oxygen transfer at the water/gas interface obeys Fick's first Law:

$$(dC)/(dt) = K_L \cdot a^* \cdot H \cdot (P'_s - P')$$

where: $K_L$ is an exchange coefficient expressed in m/s, and $a^*$ is the specific surface of water/gas exchange, expressed in $m^{-1}$, the remaining symbols having been defined earlier.

Since the coefficient $K_L$ represents a resistance to transfer which is proportionally lower when the liquid is agitated, it can be seen that it is advantageous to create a large specific surface of exchange and high agitation.

The size of the gas bubbles increases as they rise in the tube 3, owing to an increase in the mass due to the transfer of dissolved oxygen and owing to a depression due to the rise in the tube. The rate of ascent V of the bubbles increases with their radius R in accordance with Stokes's Law:

$$V = 2 \cdot [(\Delta \rho \cdot g \cdot r^2)/9\mu]$$

where: $\Delta \rho$ is the difference in density between water and the gas; g the acceleration of gravity; and $\mu$ the viscosity of water.

These millions of fine gas bubbles the radii of which increase and which travel faster and faster meet each other, which gives rise, despite the negative role of surfactants played by the organic substances present in the water, to some coalescence which contributes to the increase in the size of the bubbles as they ascend.

The separator 4, which receives the water/gas mixture leaving the column 1, makes it possible to separate the gas bubbles. Since the gas volume is relatively small, it is possible to employ a vertical separator having a water retention time of the order of 2 minutes and to supplement the degassing chemically by the injection of sulphites. This separator forms a sufficient capacity upstream of the pumps 7.

The inert gas is recovered, to be recycled, at the top of the separator 4 after passing through a dehumidifier, not shown, to avoid carry-over of water into the gas recycling circuit.

The small quantity of inert gas which is introduced continuously or periodically at 8 is adjusted to compensate for the quantity of inert gas which has dissolved in the water, by monitoring the gas flow at the outlet of the separator 4. Storage of inert gas does not present a problem, given the low consumption of this gas.

The stoichiometric quantity of hydrogen introduced at 20 to react in the chamber 6 with the oxygen extracted from the water is produced either by an electrolyser employing the water available locally or by a generator employing methanol.

The compressor 5 recompresses the gas to a pressure close to the injection pressure. In the chamber 6, the gas passes through a catalyst bed which makes the oxygen and hydrogen react to form water vapour. The temperature at the outlet of the compressor 5 must be at least 130° C. if good efficiency of the catalyst bed is to be obtained. At the outlet of the chamber 6, the regenerated inert gas contains less than 1 ppm of oxygen.

Another process for extracting oxygen from the gas to be recycled could be employed if appropriate.

There is thus provided a process in which the functions of lifting the water and deaerating the water in the column are separated so that each can be implemented under optimum conditions.

We claim:

1. A process for removing dissolved oxygen from water, comprising the steps of:

(a) immersing an elongate tubular column in a volume of naturally existing water such that said column assumes a generally vertical orientation, said column having an open lower end provided with an electrical pump for lifting water standing in the column and an upper, exit end, (b) injecting nitrogen gas into the column at a lower portion thereof, above the pump, and at a pressure no greater than the hydrostatic pressure of the water in the column at the site of injection, and (c) simultaneously with step (b), operating the pump to lift the water upwardly in the column such that the pump supplies a majority of the energy required to lift the water, (d) whereby oxygen dissolved in the water is released into rising and naturally expanding bubbles of nitrogen.

2. A process according to claim 6 wherein said electrical pump supplies at least 80% of the energy required to lift the water.

3. A process according to claim 6, wherein said gas is injected into said column in the form of fine gas bubbles with a diameter of the order of one millimeter.

4. A process according to claim 2, including separating, in a vertical separator, gaseous and liquid phases obtained as a mixture at the upper end of said column.

5. A process for deaerating water according to claim 4, including recycling said gaseous phase separated in said separator, after compression, extraction of oxygen and addition of a quantity of gas compensating for any losses of said gas due to dissolving in water.

6. The process of claim 1, wherein the volume of water is a body of sea water.

7. The process of claim 1, wherein the volume of water exists in an underground water-bearing stratum.

* * * * *